(No Model.)  G. KIMMICH.  2 Sheets—Sheet 1.
DISTANCE INSTRUMENT.
No. 594,404.  Patented Nov. 30, 1897.
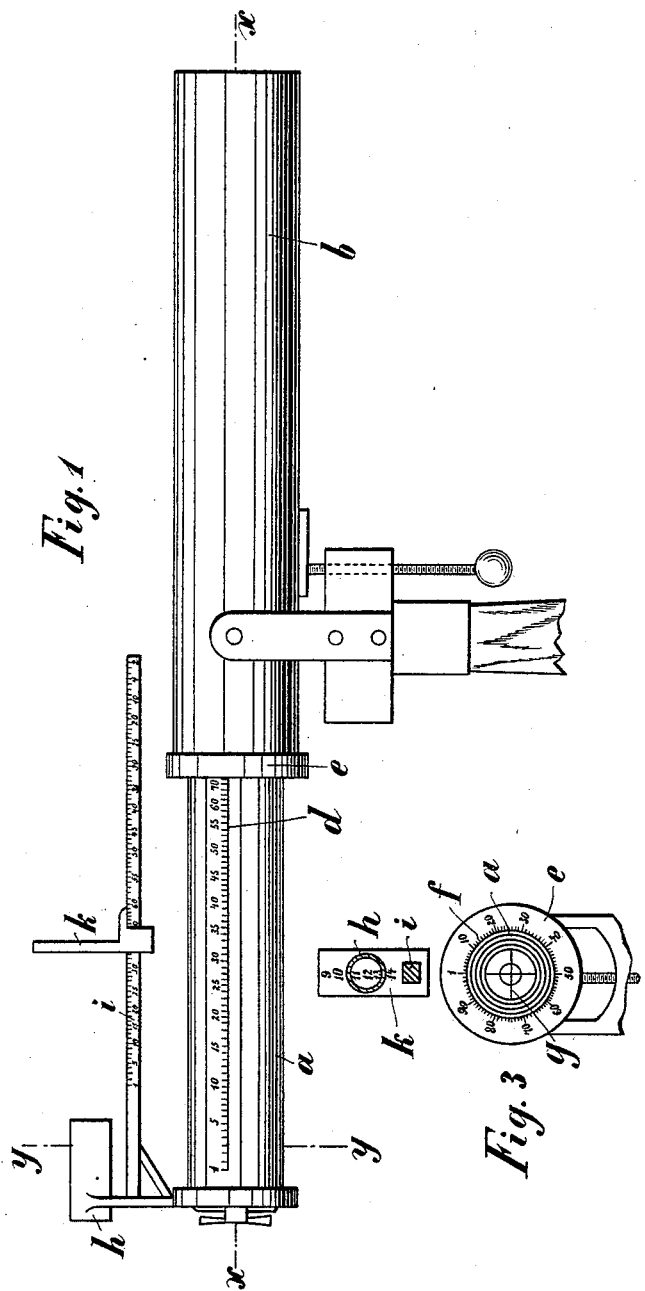

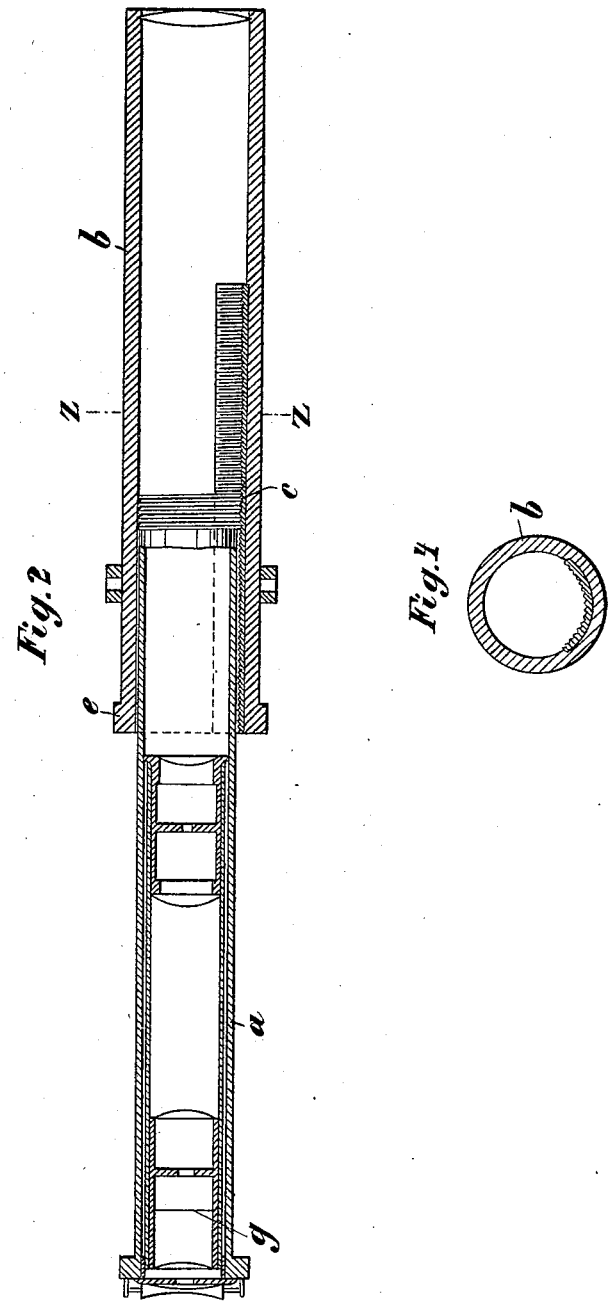

UNITED STATES PATENT OFFICE.

GOTTLIEB KIMMICH, OF ESSLINGEN, GERMANY.

DISTANCE INSTRUMENT.

SPECIFICATION forming part of Letters Patent No. 594,404, dated November 30, 1897.

Application filed January 11, 1896. Serial No. 575,136. (No model.)

*To all whom it may concern:*

Be it known that I, GOTTLIEB KIMMICH, mechanical engineer, residing at 9 Mittlere Beutau, Esslingen, in the Kingdom of Würtemberg, German Empire, have invented new and useful Improvements in Distance Instruments, of which the following is a specification.

This invention has reference to a new or improved distance-measure consisting mainly of a tube to receive the ocular glasses and provided with a graduated scale and of a second tube carrying the objective glass. The tubes are connected by screw-joints and have to be screwed against one another until the object, the distance of which is to be ascertained, appears distinctly visible, whereupon the distance can be read off the scale.

A side view of the distance-measure is represented on the accompanying drawings, in Figure 1, a section of it from $x$ to $x$ in Fig. 2, and a section of it from $y$ to $y$ of Fig. 1 in Fig. 3. Fig. 4 is a section on line $z\,z$ of Fig. 2.

The instrument, to be arranged to turn on a tripod, consists of the tube $a$, containing the ocular glasses, and of the tube $b$, carrying the objective glass, which is connected with the former by the screw-joints $c$. The screw-joints possess a definite gradation—say, for example, of one millimeter—and are arranged in a peculiar manner for the purpose of reducing the expenses for the construction of the instrument. The nut-screw of the tube $b$ forms part of a cylinder and is constructed by first cutting the nut-thread into the inner side of a cylinder and then dividing this cylinder into several parts by cutting its sides in a vertical direction. In this manner a number of nut-screws are obtained, the threads of which correspond exactly with each other and which are made by one single incision. The construction of the exterior thread of the tube $a$, engaging with the thread of the nut, is also performed in a similar manner. For this purpose the thread is cut into a tube corresponding with the diameter of the tube $a$ and divided by cross-sections into a number of rings, each one of which is connected with a tube $a$. As the threads of both tubes $a$ and $b$ must be worked very exactly, the new mode of construction reduces the expenses. On the tube $a$ is affixed the scale $d$, which corresponds to the gradation of the screw-joints. Besides this the ring at the back $e$ of the tube $b$ possesses division-lines $f$ from "1" to "100." Between the first and second lens of the tube $a$ a cross of threads $g$ has been arranged.

In using the instrument it will have to be put into position in such a manner that the rear edge of the ring $e$ of the tube $b$ rests on the point of zero of the scale $d$ of the tube $a$. Thereupon the instrument will have to be fixed at the object and the tube $a$ must be turned in the tube $b$ until the object appears in the same distinct outlines as the cross of threads $g$. After that you read off the scale $d$ the number of that division-line which now lies at the rear edge of the ring $e$, whereas on the division-lines of the ring itself will be read off the decimal figures, which have to be added to the number just obtained. As the scale of the tube $a$ is made in such a manner that each line is corresponding with a distance of one hundred meters, it is necessary to multiply the numbers read off by one hundred in order to arrive at the distance of the object.

In order to make the instrument serviceable for any eyesight, an arrangement has been affixed on the tube $a$, consisting of a pillar $h$ and a pole $i$, provided with a scale, the slider or indicator of which, $k$, is provided with numbers—for instance, "9," "10," "11," "12." The scale of the pole $i$ is so formed that on each side of the point of zero, corresponding to the normal vision, numbers have been placed. The numbers on the farther side of the point of zero indicate numbers of the glass for longsighted people, which should be placed before the ocular glass of the tube $a$, and those in this side of the point of zero, on the other hand, indicate the number of the glass for shortsighted people.

Before using the distance-measure the indicator K is pushed along until the numbers affixed on the latter are distinctly visible to the eye looking through the hull $h$, whereupon the number indicated on the pole $i$ by the indicator is read off, and the glass corresponding to it will be affixed in the proper manner in front of the ocular glass.

Having now described my invention, what I claim, and desire to secure by Letters Patent, is—

1. In a distance instrument, the tube provided with the ocular glasses and a scale extending along the tube, and the tube carrying the objective glass, in combination with a cut-out portion of a female screw, fitted to the tube carrying the objective glass, a small threaded band fixed to the forward end of the tube provided with the ocular glasses, and working in the female screw, and a ring fixed to the back of the tube carrying the objective glass, and having division-lines from 1 to 100, as and for the purpose set forth.

2. In a distance instrument the tube provided with the ocular glasses and a scale extending along the tube, and the tube carrying the objective glass, in combination with a cut-out portion of a female screw, fitted to the tube carrying the objective glass, a small threaded band fixed to the forward end of the tube provided with the ocular glasses, and working in the female screw, a ring fixed to the back of the tube carrying the objective glass, and having division-lines from 1 to 100, and a cross of threads arranged between the first and the second lens of the tube carrying the ocular glasses, as and for the purpose specified.

3. A distance instrument composed of a tube provided with the ocular glasses and a scale, and a tube carrying the objective glass and a graduated ring, said tubes being connected by a screw-joint, in combination with a pillar fixed to the tube having the ocular glasses, an arm fitted to the pillar and provided with a scale formed in such a manner that on each side of the point of zero corresponding to the normal vision are numbers of the glasses to be added to the ocular glass for abnormal vision, and an indicator having numbers and adapted to be pushed along the arm, substantially as and for the purpose described.

In testimony that I claim the foregoing as my invention I have signed my name in presence of two subscribing witnesses.

GOTTLIEB KIMMICH.

Witnesses:
MAX MIRUS,
HY. KÖRNER.